United States Patent

Gravely et al.

[11] Patent Number: 5,642,452
[45] Date of Patent: Jun. 24, 1997

[54] WATER-BLOCKED OPTICAL FIBER COMMUNICATIONS CABLE

[75] Inventors: Richard G. Gravely, Cary; Stephen R. Stokes, Raleigh; Takashi Tanaka, Cary, all of N.C.

[73] Assignee: Sumitomo Electric Lightwave Corp., RTP, N.C.

[21] Appl. No.: 391,248

[22] Filed: Feb. 21, 1995

[51] Int. Cl.⁶ ........................................ G02B 6/44
[52] U.S. Cl. ...................... 385/113; 385/103; 385/112
[58] Field of Search ................................ 385/100–114

[56] References Cited

U.S. PATENT DOCUMENTS

| | | | |
|---|---|---|---|
| 4,703,998 | 11/1987 | Uchioke et al. | 350/96.23 |
| 4,815,813 | 3/1989 | Arroyo et al. | 385/113 |
| 4,909,592 | 3/1990 | Arroyo et al. | 385/113 |
| 4,913,517 | 4/1990 | Arroyo et al. | 350/96.23 |
| 5,133,034 | 7/1992 | Arroyo et al. | 385/103 |
| 5,389,442 | 2/1995 | Arroyo et al. | 385/103 |
| 5,390,273 | 2/1995 | Rahman et al. | 385/113 |
| 5,481,635 | 1/1996 | Arroyo et al. | 385/103 |

*Primary Examiner*—John Ngo
*Attorney, Agent, or Firm*—Richard E. Jenkins, P.A.

[57] ABSTRACT

A water-tight optical fiber communications cable constructed without the use of a viscous water-blocking compound other than in the buffer tubes thereof. One or more water swellable yarns are helically wrapped around the central strength member to absorb any water which may be present in the interstices between the central strength member and the buffer tubes. Additionally, a water swellable tape is disposed between the core and the jacket of the cable to absorb water from the interstices between the buffer tubes and elements overlaying the core of the cable.

33 Claims, 5 Drawing Sheets

WATER-BLOCKED OPTICAL FIBER COMMUNICATIONS CABLE

TECHNICAL FIELD

The present invention relates to an improved optical fiber communications cable. More particularly, the invention relates to an optical fiber communications cable in which water is prevented from entering the central core area of the cable and from longitudinally flowing along the interior of the fiber optic cable.

RELATED ART

Optical fiber cables are being used more and more in the United States and throughout the world, but the cables still are many times subject to penetration of water into the core of the cable which can result in a deterioration of transmission characteristics and other related problems. Water presents a hazard to optical fiber communications cable in that it can cause catastrophic failure; long-term reduction in optical fiber cable reliability; and/or systematic increases in cable transmission attenuation.

If the central core area of an optical fiber communications cable is exposed to water infiltration and subsequent freezing should occur, the expansion of the frozen water will cause stress to be applied to the optical fibers and other optical fiber cable structure elements so as to lead to premature failure of cable transmission capability. This failure may be caused by breakage of the optical fibers and/or attenuation increase in the optical fibers due to the applied stresses.

Also, water penetration of a cable which results in water contact with the optical fibers can cause a migration of hydrogen ions and hydroxyl ions into the optical fiber communications cable core which can in turn result in an attenuation increase over the life of the optical fibers to the point that the attenuation will exceed the budgeted system losses and render the optical fibers useless. Moisture also can attack the surface of the glass optical fibers and increase the likelihood of premature mechanical failure of the optical fibers within a cable.

In order to overcome water penetration and/or water migration problems, it has been the practice in prior cable designs to use an oil/jelly based viscous compound to fill the interstices of an optical fiber cable so as to prevent the flow of water along the axis of the cable. This prior cable design does serve to effectively prevent water from entering long lengths of an optical fiber cable and eventually flowing into fiber splice enclosures and creating significant damage. However, it suffers from many shortcomings including excessive cable weight and questionable reliability of the cable interstices filling process with the viscous compound.

Also, efforts have been made to deal with the water penetration/water migration problem by using superabsorbent compounds which are added to an optical fiber cable in the form of treated yarns, tapes and/or other core elements as well as applying thin coatings and powder selectively to the cable construction. U.S. Pat. Nos. 4,703,998; 4,913,517; and 5,133,034 are representative patents relating to the use of superabsorbent compounds in optical fiber cable constructions in order to impart water-blocking capabilities to optical fiber cable. However, none of the prior efforts to utilize superabsorbent compounds have proven to be effective at a modest cost for reasons that are well known to one skilled in the art.

Seemingly, the prior art does not include a cost effective and reliable water-blocked optical fiber communications cable structure. Applicants believe that the foregoing problems of the prior art have been overcome by the optical fiber cable of the present invention.

DISCLOSURE OF THE INVENTION

In accordance with the present invention, applicants provide a water-blocked optical fiber communications cable possessing enhanced performance characteristics. The cable comprises a core including a longitudinally extending central strength member, and at least one generally longitudinally extending buffer tube which includes at least one optical fiber therein. The buffer tube is positioned around at least a portion of the circumference of the central strength member. A jacket is provided around and encloses the cable core.

A water-blocking system is positioned between the central strength member of the cable core and the cable jacket and comprises at least one yarn possessing water swellable characteristics and which extends longitudinally along the length of the central strength member. The water-blocking system also includes a protective layer possessing water swellable characteristics which is positioned between the cable core and the cable jacket and extends around and longitudinally along the buffer tube. Thus, the interstices within the cable core are substantially filled when water penetrates the cable and comes into contact with the water-blocking system so as to prevent water passage (migration) longitudinally along the cable.

It is therefore an object of the present invention to provide an improved water-blocked optical fiber communications cable.

It is another object of the present invention to provide an improved water-blocked optical fiber communications cable of the type which utilizes superabsorbent compounds and/or superabsorbent compound-treated elements in the construction of the cable which overcomes shortcomings of previous cable constructions.

It is another object of the present invention to provide an improved water-blocked optical fiber communications cable wherein cable weight is significantly reduced vis-a-vis viscous jelly cable constructions so as to enhance handlability and to reduce installation time and costs.

It is still another object of the present invention to provide an improved water-blocked optical fiber communications cable wherein the cable jacket to cable core coupling coefficient may be controlled vis-a-vis viscous jelly cable constructions.

It is still another object of the present invention to provide an improved water-blocked optical fiber communications cable with an enhanced buffer tube to tension member coupling coefficient.

It is yet another object of the present invention to provide an improved water-blocked optical fiber communications cable which utilizes yarns and tapes treated with superabsorbent compounds to impart water-blocking characteristics to the cable and to minimize material usage and costs as well as to maximize the cable manufacturing line speed.

Some of the objects of the invention having been stated hereinabove, other objects will become evident as the description proceeds, when taken in connection with the accompanying drawings as best described hereinbelow.

BEST MODE FOR CARRYING OUT THE INVENTION

Figure 1:
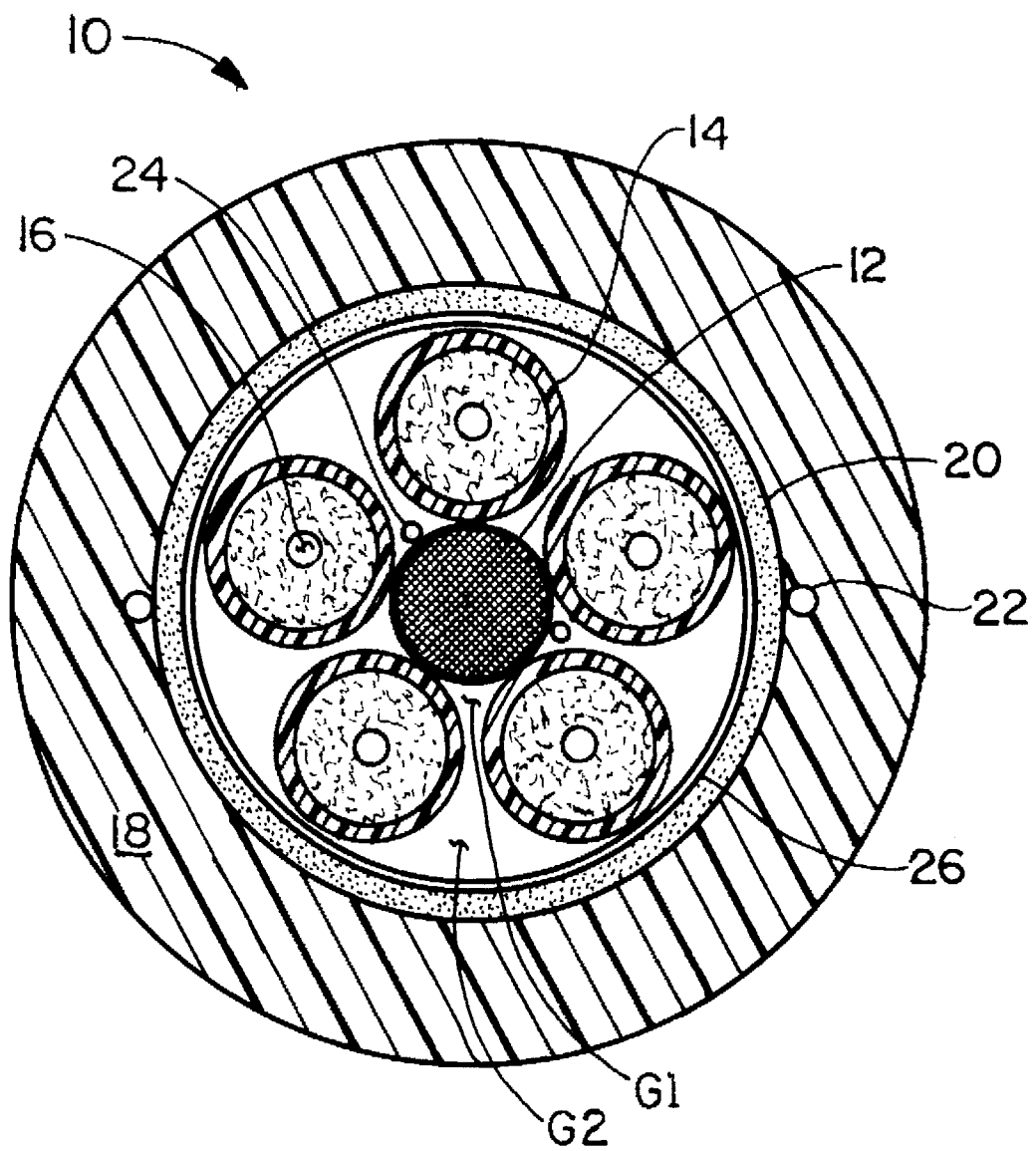
FIG. 1 shows a vertical cross-sectional view of a preferred embodiment of the present invention.

Referring now to FIG. 1, there is shown therein a water-blocked optical fiber communications cable constructed in accordance with the preferred embodiment of the present invention and which is designated generally by the numeral 10. This embodiment relates to a water-blocked optical fiber communications cable of the type which includes a central strength member 12 which extends along the longitudinal axis of cable 10 and is most suitably formed of fiber reinforced plastic (FRP). Central strength member 12 is surrounded by five (5) buffer tubes 14. Buffer tubes 14 are of the jelly-filled type and each contains at least one optical fiber 16 therein. As a matter of design choice, applicant contemplates that cable 10 may comprise 1–18 buffer tubes 14 and that the buffer tubes may each comprise 1–12 optical fibers 16 therein.

Buffer tubes 14 extend generally longitudinally along the length of central strength member 12 and may be stranded therearound or extend parallel therewith as a matter of cable design choice. Central strength member 12 and buffer tubes 14 form the core of cable 10, and a jacket 18, preferably formed in plastic, encloses the cable core. Typically, a plurality of aramid or glass strength members 20 (most suitably formed of KEVLAR®, a trademark for a type of aramid sold by DuPont Corporation of Wilmington, Del.) are positioned between the core and jacket 18 of the cable for providing greater strength thereto, and rip cords 22 may be provided adjacent aramid or glass strength elements 20 and jacket 18 in a manner which is well known to one skilled in the art.

Still referring to FIG. 1, it can be seen that the core of cable 10 as described hereinabove inherently possesses two types of interstitial gaps therein. The first interstitial gaps G1 are found between central strength member 12 and buffer tubes 14. The second interstitial gaps G2 are to be found between buffer tubes 14 as well as between buffer tubes 14 and the elements overlaying the core of cable 10. Applicants' inventive cable construction is uniquely designed to fill both interstitial gaps G1 as well as interstitial gaps G2 when the core of cable 10 is penetrated by water and to prevent the migration of the water along the length of the cable core.

More specifically, applicants' novel water-blocking system essentially comprises a pair of spaced-apart and counter-helically wound water-blocking yarns 24 which will act to swell and water block gaps G1 upon water penetration of the core of cable 10. The second very important part of the water-blocking system is water-blocking tape 26, most suitably formed from woven polyester, which is provided between the cable core and aramid or glass strength elements 20 and jacket 18 of cable 10. Water-blocking tape 26, serves to swell and water-block interstitial gaps G2 when the core of cable 10 is penetrated by water. In this fashion, an unexpected and surprisingly superior water-blocked optical fiber communications cable construction is provided which (1) does not utilize prior art oil/jelly viscous compounds to fill the interstices of the cable and (2) which overcomes the shortcomings of prior art water-blocked cable constructions which utilize superabsorbent compounds similar to those utilized by applicants to treat applicants' water-blocking yarns 24 and water-blocking tape 26.

Cable 10 is a loose buffered tube-type structure wherein jelly-filled buffer tubes 14 contain one or more optical fibers 16. Although FIG. 1 depicts a cable construction utilizing five (5) buffer tubes 14 and having one optical fiber 16 in each of the tubes, applicants contemplate as noted hereinabove that the invention also encompasses the use of substantially any number of buffer tubes 14 wherein each buffer tube contains at least one optical fiber 16 therein. Cable 10 provides water-blocking characteristics through the use of water-blocking (water swellable) yarns 24 and water-blocking tape 26.

Both yarns 24 and tape 26 are suitably treated with a superabsorbent compound such as PAA (polyacrylic acid) so as to be water swellable when water comes into contact therewith, and buffer tubes 14 are conventional jelly-filled buffer tubes containing one or more optical fibers 16. Although applicants utilize PAA superabsorbent compound in the preferred embodiment of the invention, other superabsorbent material can be utilized such as polyacrylamide, blends of polyacrylic acid and polyacrylamide, salts of polyacrylic acid and polyacrylamide and copolymers of polyacrylic acid and polyacrylamide.

Finally, as will be explained in more detail below, aramid or glass strength elements 20 are conventional untreated elements.

One of the two primary elements of the novel water-blocking system of cable 10 is the use of water-blocking yarns 24. Although two yarns are shown in FIG. 1, applicants contemplate that one or more water-blocking yarns 24 may be used as a matter of design choice. Preferably, two water-blocking yarns 24 are counter-helically wrapped around central strength member 12 and, although the pitch of the wrapping can be varied, the pitch should most suitably be 500 mm or less in order to assure complete water-blockage in interstitial gaps G1. Alternatively, one or more yarns 24 may be provided along the length of and adjacent central strength member 12 but not helically wrapped therearound.

Yarns 24 should be significantly compressible in order to minimize their effect on cable diameter and tube bend diameter. For example, if cable 10 utilizes two 1.00 mm diameter counter-helically wrapped yarns 24 about central strength member 12, there is a 2.00 mm effective diameter increase at their cross location within cable 10. Since the purpose of yarns 24 is to provide water-blocking in interstitial gaps G1 between central strength member 12 and buffer tubes 14, yarns 24 must compress where buffer tubes 14 lay over the yarns. Thus, there exists a dependence of the size of water-blocking yarns 24 based on the size of interstitial gaps G1.

In loose tube cable design, interstitial gaps G1 are a function of the size of central strength member 12, the dimensions of buffer tubes 14, and the number of buffer tubes 14 arranged around central strength member 12. For this reason, applicants believe that careful attention must be paid to parameters such as diameter, swell size and swell rate when selecting suitable water-blocking yarns 24 to construct cable 10. Applicants believe that the selection of the proper parameters for water-blocking yarns 24 of cable 10 can be accomplished by one skilled in the art.

In addition to interstitial gaps G1, water penetration of interstitial gaps G2 about the core of cable 10 is also of major concern, and water-blocking tape 26, which can be applied either longitudinally or helically, is intended to address this concern. Tape 26 performs the function of water-blocking by swelling in the presence of water to fill interstitial gaps G2 to assist in precluding the passage of water further along the length of cable 10. Tape 26, which swells both inwardly and outwardly, also will swell sufficiently to prevent water from flowing along aramid or glass strength elements 20 via "wicking". Water swellable tape 26 is carefully selected and tested in order to obtain optimum swell height and swell rate to effectively block water flow in cable 10.

Thus, applicants contemplate that the combination of water-blocking yarns 24 and water-blocking tape 26 should serve to prevent water flow along the length of cable 10 when there is an instance of water penetration of the cable. Although other superabsorbent compounds could be utilized, applicants prefer that water-blocking yarns 24 and water-blocking tape 26 be treated with PAA (polyacrylic acid) which has been found to be particularly effective. The treatment of these elements can be accomplished by surface coating onto the tape or impregnation of the yarns by the supplier thereof.

In most dielectric central strength member cable designs, the use of aramid or glass strength elements 20 is necessary to increase the tensile strength of cable 10. Applicants presently believe that the use of water-blocking yarns 24 and water-blocking tape 26 will serve to very effectively block water flow along cable 10.

Although, as stated hereinabove, applicants believe that the selection of the proper parameters for water-blocking yarns 24 and water-blocking tape 26 is within the ability of one skilled in the art, applicants by way of example would like to describe elements of a representative cable construction of the FIG. 1 cable in Table I below.

TABLE I (a) FRP Central Strength Member.

(b) 2 Water Blocking Yarns (counter-helically wound around central strength member and treated w/PAA for minimum absorption capacity of 15 g/g).

(c) 5 Buffer Tubes (6 Optical fibers per tube).

(d) Water Blocking Tape around cable core (woven polyester treated w/PAA for swelling speed>6 mm/min. and swelling height>6.50 mm).

(e) 6 Aramid Strength Members (Non-Water Swellable) around Water Blocking Tape.

(f) Plastic Jacket Over Aramid Strength Members.

Referring now to FIGS. 2 through 3A–3B, applicants will describe several alternative embodiments of the inventive improved water-blocked optical fiber communications cable of the invention.

Figure 2A:
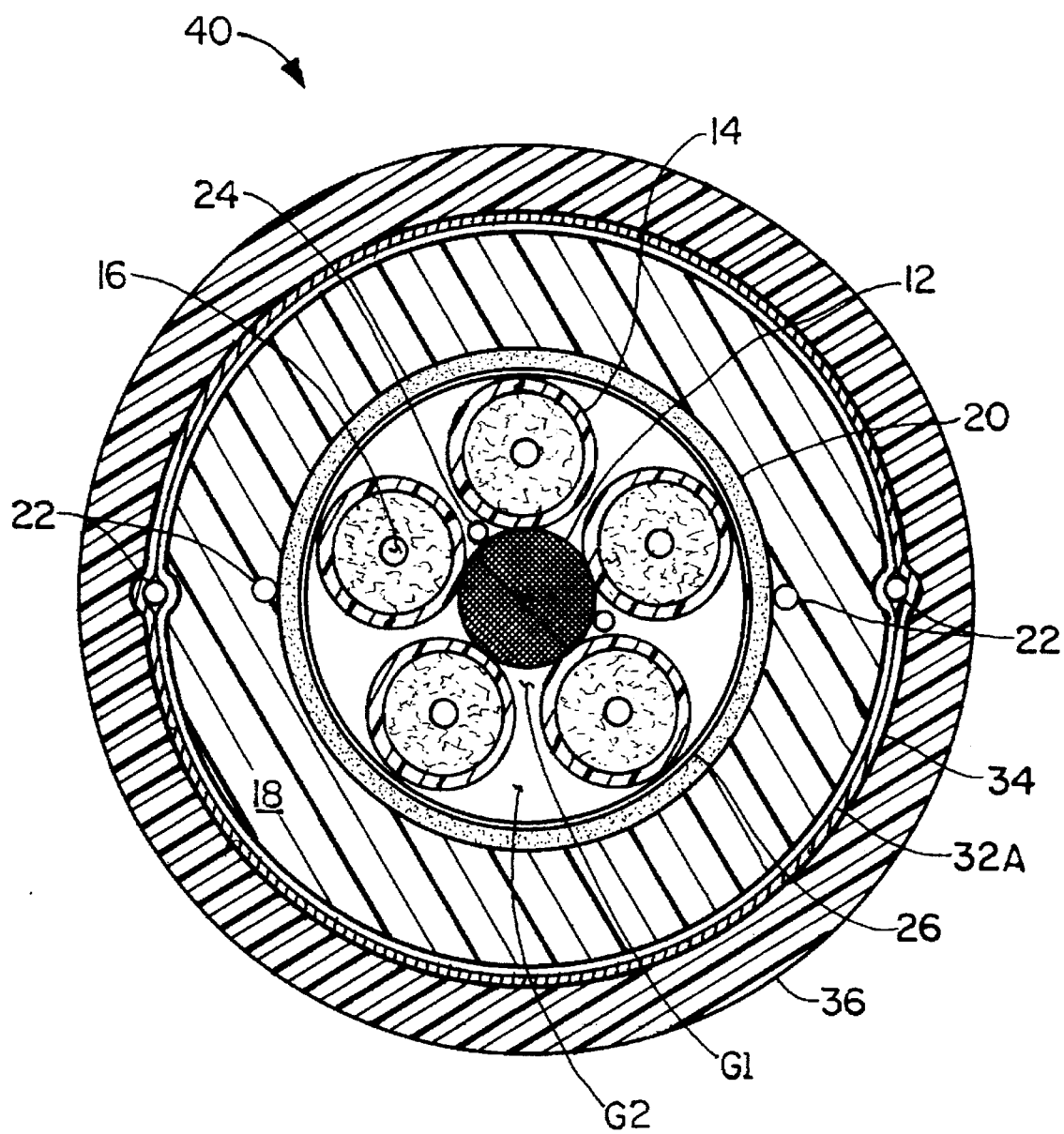
FIGS. 2A–2B show a vertical cross-sectional view of a second embodiment of the present invention.
Figure 2B:
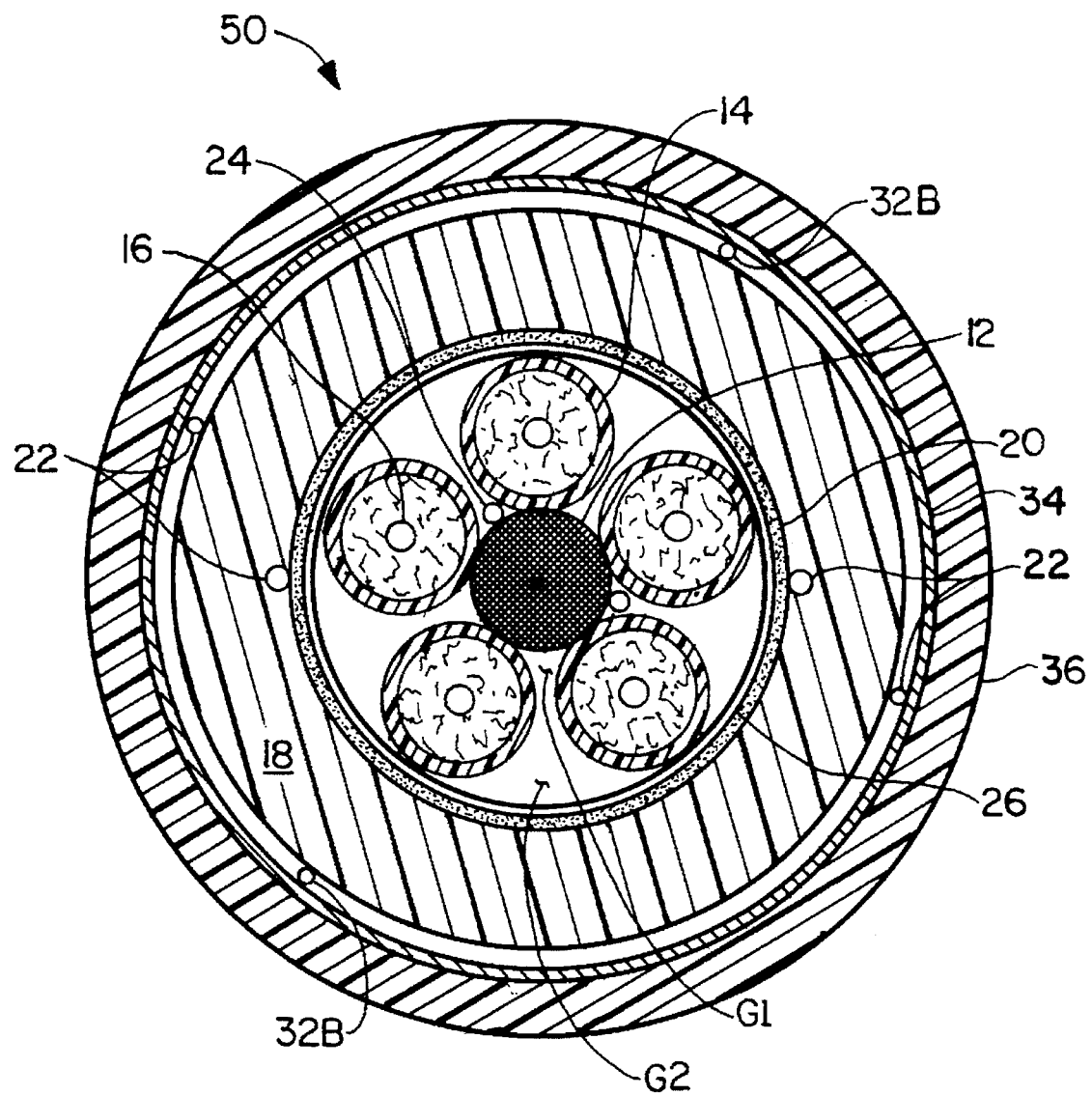

Referring now to FIGS. 2A and 2B, a second embodiment of the improved water-blocked optical fiber communications cable constructed in accordance with the present invention is generally designated by the numeral 40. Cable 40 is similar in construction to cable 10 but includes a second water blocking-tape 32A around the circumference thereof and a metal tape 34 (either corrugated or flat) overlaying the circumference of water-blocking tape 32A. Additional rip cords 22 are provided between water-blocking tape layer 32A and metal tape 34, and a second jacket 36 (preferably formed of plastic) forms the outer jacket of cable 40. FIG. 2B shows a cable 50 which is substantially identical in construction to cable 40 in FIG. 2A except that water-blocking yarns 32B are provided between jacket 18 and metallic tape 34 in lieu of water-blocking tape 32A. One or more water-blocking yarns 32B are most suitably helically or counter-helically wrapped around jacket 18, although they may also be oriented so as to extend substantially parallel to the longitudinal axis of cable 50.

Figure 3A:
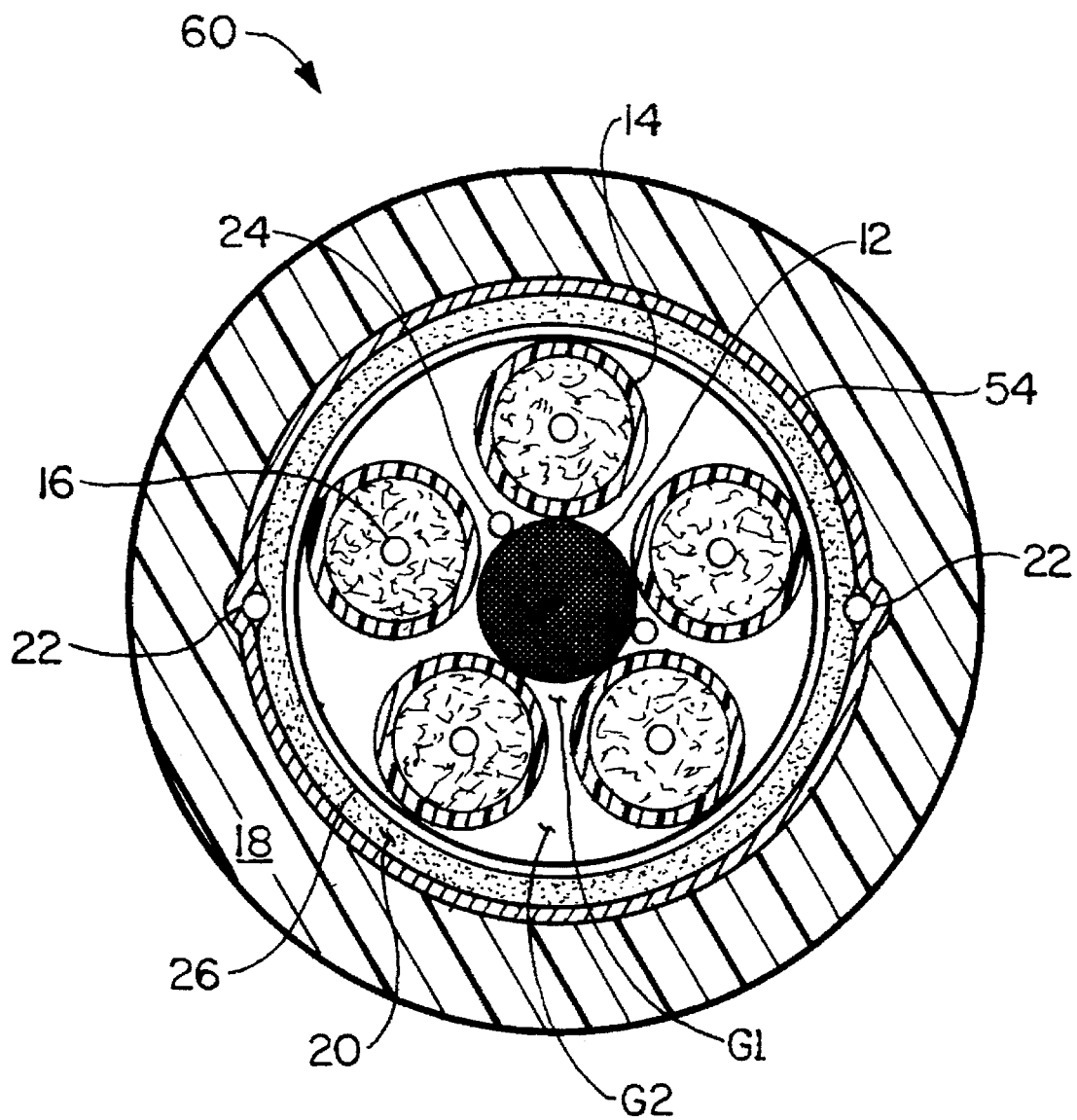
FIGS. 3A–3B show a vertical cross-sectional view of a third embodiment of the present invention.
Figure 3B:
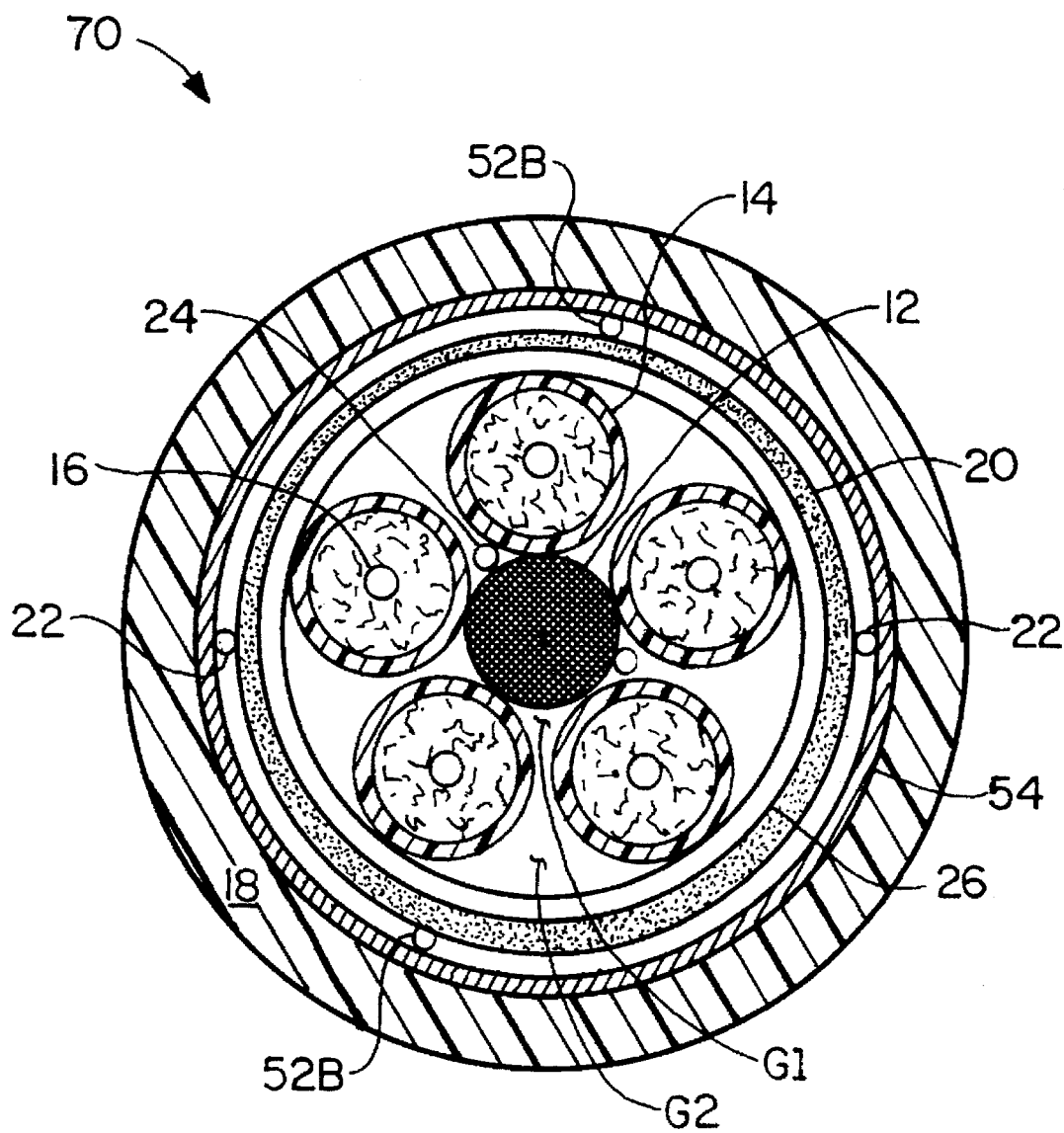

Referring now to FIGS. 3A and 3B, a third embodiment of the improved water-blocked optical fiber communications cable of the present invention is shown in detail. Referring first to FIG. 3A, cable 60 is constructed similar to cable 60 shown in FIG. 1 but includes metal tape 54 (either corrugated or flat) provided over aramid or glass strength members 20, and rip cords 22 are positioned therebetween on opposing sides of cable 60. Thus, cable 60 differs from cable 10 primarily in that metal tape 54 is provided between aramid or glass strength members 20 and jacket 18 (preferably formed of plastic) enclosing the cable core. Cable 70 shown in FIG. 3B is similar to cable 60 shown in FIG. 3A except that water-blocking yarns 52B are provided between aramid or glass strength members 20 and metal tape 54. One or more water-blocking yarns 52B are preferably helically or counter-helically stranded around the circumference of aramid or glass strength members 20 although water-blocking yarns 52B may also be positioned generally parallel to the longitudinal axis of cable 60.

This completes the description of several preferred embodiments of the invention. Although preferred embodiments have been described, it is believed that numerous modifications and alterations thereto would be apparent to one of ordinary skill in the art without departing from the spirit and scope of the invention. Furthermore, the foregoing description is for the purpose of illustration only, and not for the purpose of limitation-the invention being defined by the claims.

What is claimed is:

1. An optical fiber cable, which comprises:
    a core comprising a longitudinally extending central strength member, and at least one generally longitudinally extending buffer tube comprising at least one optical fiber, said buffer tube being positioned around at least a portion of the circumference of said central strength member;
    a jacket enclosing said core; and
    a water-blocking system disposed between said central strength member of said core and said jacket, said water-blocking system comprising at least one yarn possessing water swellable characteristics and extending generally longitudinally along the length of said central strength member, and a protective layer possessing water swellable characteristics positioned between said core and said jacket and extending around said buffer tube and longitudinally along the length thereof;
    whereby interstices within said core are substantially filled when water comes into contact with said water-blocking system so as to prevent water passage longitudinally along the cable.

2. The optical fiber cable of claim 1 wherein said central strength member comprises fiber reinforced plastic (FRP).

3. The optical fiber cable of claim 1 wherein said at least one buffer tube comprises a plurality of buffer tubes and wherein said buffer tubes are jelly filled and stranded around said central strength member.

4. The optical fiber cable of claim 3 comprising 1–18 buffer tubes wherein each of said buffer tubes contains 1–12 optical fibers.

5. The optical fiber cable of claim 1 wherein said jacket is formed of plastic.

6. The optical fiber cable of claim 1 wherein said at least one yarn possessing water swellable characteristics comprises two spaced-apart yarns which are counter-helically wrapped around said central strength member.

7. The optical fiber cable of claim 6 wherein the pitch of said wrapped yarns is no greater than 500 mm.

8. The optical fiber cable of claim 1 wherein said yarn is compressible and contains a superabsorbent compound.

9. The optical fiber cable of claim 8 wherein said superabsorbent compound comprises polyacrylic acid (PAA).

10. The optical fiber cable of claim 1 wherein said protective layer of said water-blocking system comprises tape.

11. The optical fiber cable of claim 10 wherein said tape is formed of woven polyester.

12. The optical fiber cable of claim 1 wherein said protective layer contains a superabsorbent compound.

13. The optical fiber cable of claim 12 wherein said superabsorbent compound comprises polyacrylic acid (PAA).

14. The optical fiber cable of claim 1 wherein said cable further comprises a layer of strength members positioned between said water-blocking system and said jacket, said strength members extending generally longitudinally along the length of the cable.

15. The optical fiber cable of claim 14 wherein said strength members are conventional, non-water swellable aramid or glass members.

16. An optical fiber cable, which comprises:

a core comprising a longitudinally extending central strength member, and a plurality of generally longitudinally extending buffer tubes each comprising at least one optical fiber, said buffer tubes being positioned around at least a portion of the circumference of said central strength member;

a jacket enclosing said core;

a water-blocking system disposed between said central strength member of said core and said jacket, said water-blocking system comprising at least one yarn possessing water swellable characteristics helically wrapped around said central strength member and extending longitudinally along the length thereof, and a protective layer possessing water swellable characteristics positioned between said core and said jacket and extending around said plurality of buffer tubes and longitudinally along the length thereof; and a layer of strength members positioned between said water-blocking system and said jacket, said strength members extending generally longitudinally along the length of the cable;

whereby interstices within said core are substantially filled when water comes into contact with said water-blocking system so as to prevent water passage longitudinally along the cable.

17. The optical fiber cable of claim 16 wherein said central strength member comprises fiber reinforced plastic (FRP).

18. The optical fiber cable of claim 16 wherein said buffer tubes are jelly filled and stranded around said central strength member.

19. The optical fiber cable of claim 18 comprising 1–18 buffer tubes wherein each of said buffer tubes contains 1–12 optical fibers.

20. The optical fiber cable of claim 16 wherein said jacket is formed of plastic.

21. The optical fiber cable of claim 16 wherein said at least one yarn of said water-blocking system comprises two spaced-apart yarns which are counter-helically wrapped around said central strength member.

22. The optical fiber cable of claim 21 wherein the pitch of said wrapped yarns is no greater than 500 mm.

23. The optical fiber cable of claim 16 wherein said yarns are compressible and contain a superabsorbent compound.

24. The optical fiber cable of claim 23 wherein said superabsorbent compound comprises polyacrylic acid (PAA).

25. The optical fiber cable of claim 16 wherein said protective layer of said water-blocking system comprises tape.

26. The optical fiber cable of claim 25 wherein said tape is formed of woven polyester.

27. The optical fiber cable of claim 16 wherein said protective layer contains a superabsorbent compound.

28. The optical fiber cable of claim 27 wherein said superabsorbent compound comprises polyacrylic acid (PAA).

29. The optical fiber cable of claim 16 wherein said strength members are conventional, non-water swellable members.

30. The optical fiber cable of claim 29 wherein said strength members comprise aramid strength members.

31. The optical fiber cable of claim 16 including a second protective layer possessing water swellable characteristics positioned over said jacket; a metal layer positioned over said second protective layer; and a second jacket positioned over and enclosing said cable.

32. The optical fiber cable of claim 16 including at least one yarn possessing water swellable characteristics positioned over said jacket and extending along the length thereof; a metal layer positioned over said at least one yarn and said jacket; and a second jacket positioned over and enclosing said cable.

33. The optical fiber of claim 16 including at least one yarn possessing water swellable characteristics and positioned over said layer of strength members and extending along the length thereof; and a metal layer positioned over said at least one yarn and between said at least one yarn and said jacket.

* * * * *